(12) United States Patent
Cheng et al.

(10) Patent No.: US 8,050,051 B2
(45) Date of Patent: Nov. 1, 2011

(54) CONTAINER ASSEMBLY FOR ELECTRONIC DEVICE

(75) Inventors: Xue-Li Cheng, Shenzhen (CN);
Qing-Zhi Yang, Shenzhen (CN);
Hsuan-Tsung Chen, Taipei Hsien (TW);
Xiao-Zhong Jing, Shenzhen (TW);
Guang-Yao Lee, Taipei Hsien (TW)

(73) Assignees: Hong Fu Jin Precision Industry (ShenZhen) Co., Ltd., Shenzhen, Guangdong Province (CN); Hon Hai Precision Industry Co., Ltd., Tu-Cheng, New Taipei (TW)

( * ) Notice: Subject to any disclaimer, the term of this patent is extended or adjusted under 35 U.S.C. 154(b) by 382 days.

(21) Appl. No.: 12/475,508

(22) Filed: May 30, 2009

(65) Prior Publication Data

US 2010/0142129 A1 Jun. 10, 2010

(30) Foreign Application Priority Data

Dec. 4, 2008 (CN) .......................... 2008 1 0305968

(51) Int. Cl.
*G06F 1/16* (2006.01)
(52) U.S. Cl. .................................. 361/801; 361/679.01
(58) Field of Classification Search ............. 361/679.01, 361/801
See application file for complete search history.

(56) References Cited

U.S. PATENT DOCUMENTS

| 6,116,933 | A  | * | 9/2000 | Willhite ........................ 439/260 |
|---|---|---|---|---|
| 6,398,168 | B1 | * | 6/2002 | O Tae ........................... 248/27.3 |
| 7,428,743 | B2 | * | 9/2008 | Kumeda et al. ............... 720/692 |
| 7,721,970 | B2 | * | 5/2010 | Liang et al. ................... 235/479 |
| 7,733,659 | B2 | * | 6/2010 | Snider et al. ................. 361/752 |
| 2002/0066832 | A1 | * | 6/2002 | Kwon ........................... 248/27.3 |
| 2009/0289092 | A1 | * | 11/2009 | Lee et al. ...................... 224/483 |
| 2010/0202623 | A1 | * | 8/2010 | Snider et al. ................... 381/58 |

* cited by examiner

*Primary Examiner* — Lisa Lea Edmonds
(74) *Attorney, Agent, or Firm* — Altis Law Group, Inc.

(57) ABSTRACT

A container assembly for accommodating an electronic device in a panel, includes: a retainer attached to the panel; a cover with the electronic device attached thereto pivotably attached to the retainer, and pivotable between an open position and a closed position; a lock for locking the cover at the closed position; a gear damper; a rotating shelf attached to the cover and sandwiching the electronic device with the cover, a rack formed on the rotating shelf configured for engaging with the gear damper; and an elastic support sandwiched between the retainer and the rotating shelf for biasing the cover to the open position via restoring force of the elastic support; wherein the gear damper depresses the restoring force of the elastic support.

15 Claims, 17 Drawing Sheets

CONTAINER ASSEMBLY FOR ELECTRONIC DEVICE

BACKGROUND

1. Technical Field

The disclosure relates to container assemblies for electronic devices and, particularly, to a container assembly which can be smoothly opened to expose an electronic device contained therein.

2. Description of Related Art

Memory cards are increasingly used as information recording media, and even may progressively replace floppy disks and compact disks. For example, portable devices such as digital cameras, digital video cameras, MP3 players, personal digital assistants (PDA) and cell phones use memory cards for storing information or image data. The information stored in the memory card is usually accessed by a memory card reader, and is then transmitted to a host such as a personal computer.

Typically, a card reader is located in a container installed in a computer chassis. When the container is opened, a spring is restored to quickly eject the card reader. Therefore, the relative moving parts of the container may generate noise, and the relative movement is not smooth.

DETAILED DESCRIPTION

Figure 1:
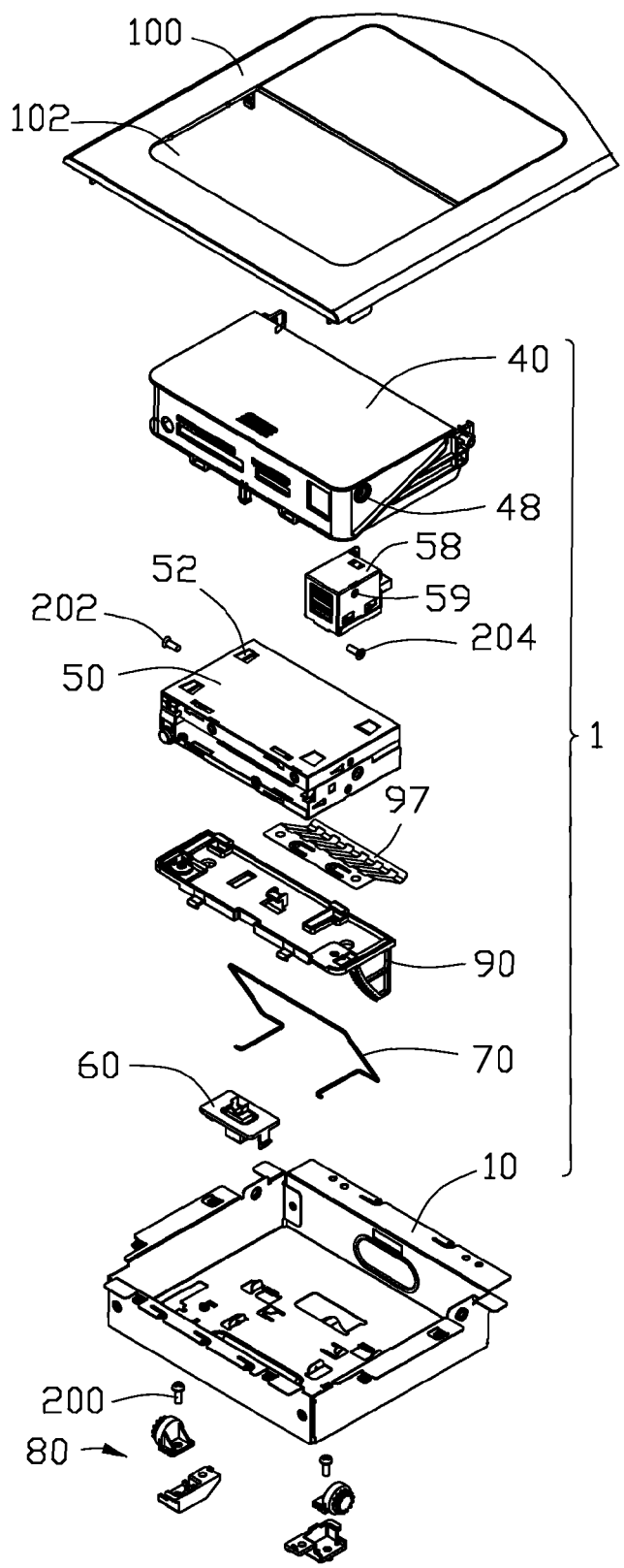
FIG. 1 is an exploded, isometric view showing an exemplary embodiment of a container assembly, with a card reader and a computer panel; the container assembly includes retainer, a cover, a rotating shelf, an elastic support, two gear dampers, and a lock.
Figure 2:
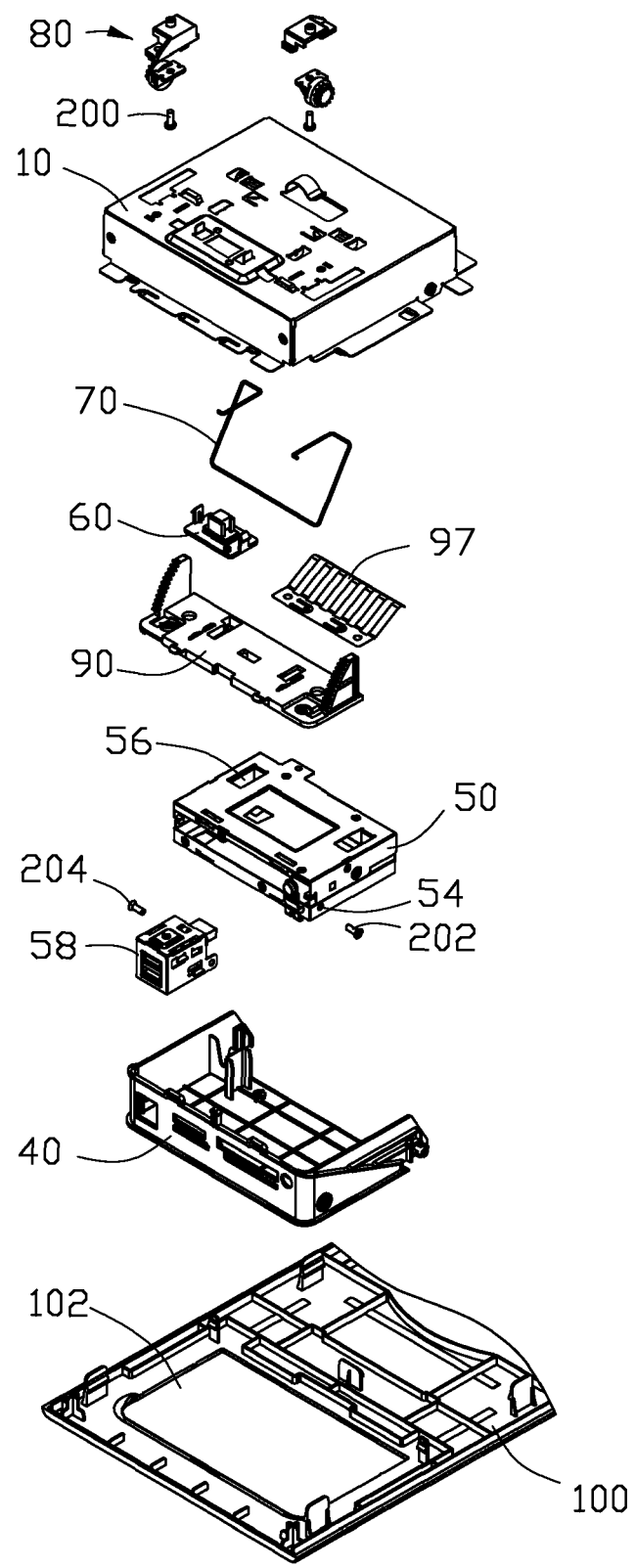
FIG. 2 is an inverted view of FIG. 1.

Referring to FIGS. 1 and 2, an embodiment of a container assembly 1 is provided for containing an electronic device to a computer panel 100. The container assembly 1 includes a retainer 10 attached to the panel 100, a cover 40 pivotably attached to the retainer 10, a lock 60 attached to the retainer 10, an elastic support 70, two gear dampers 80, and a rotating shelf 90 attached to the electronic device. In this embodiment, the electronic device includes a card reader 50 and an interface module 58.

Figure 3:
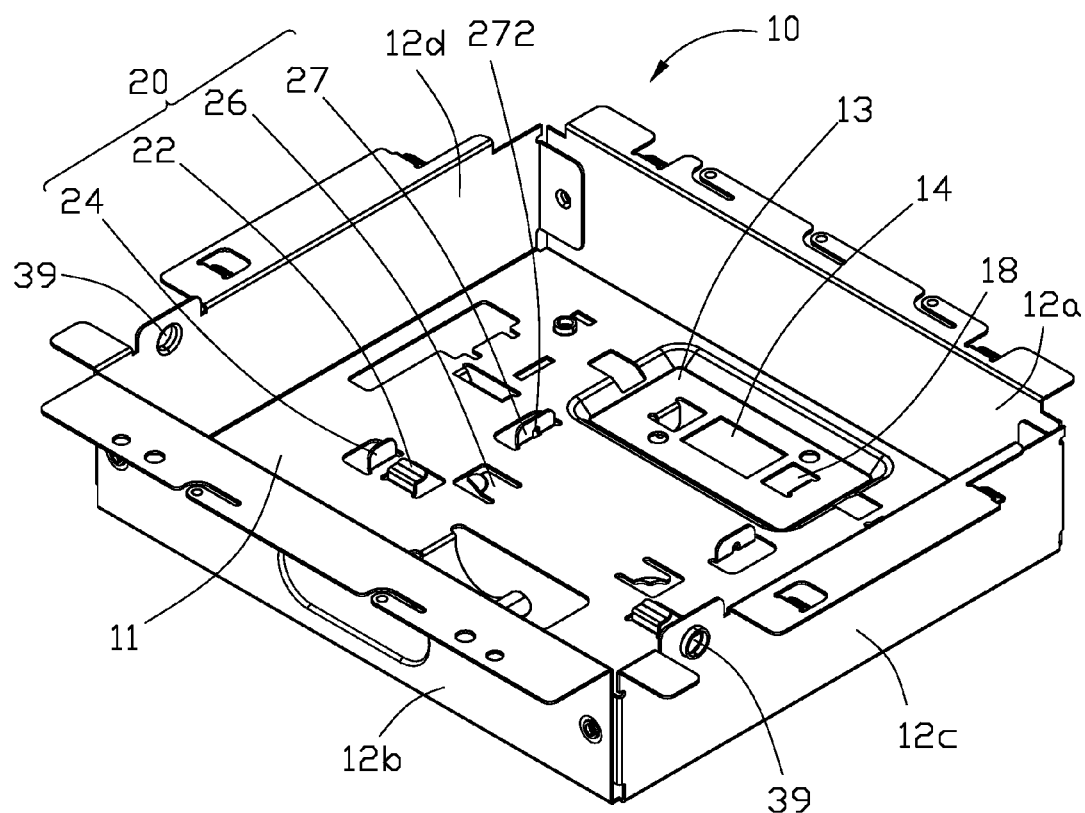
FIG. 3 is an enlarged view of the container of FIG. 1.
Figure 4:
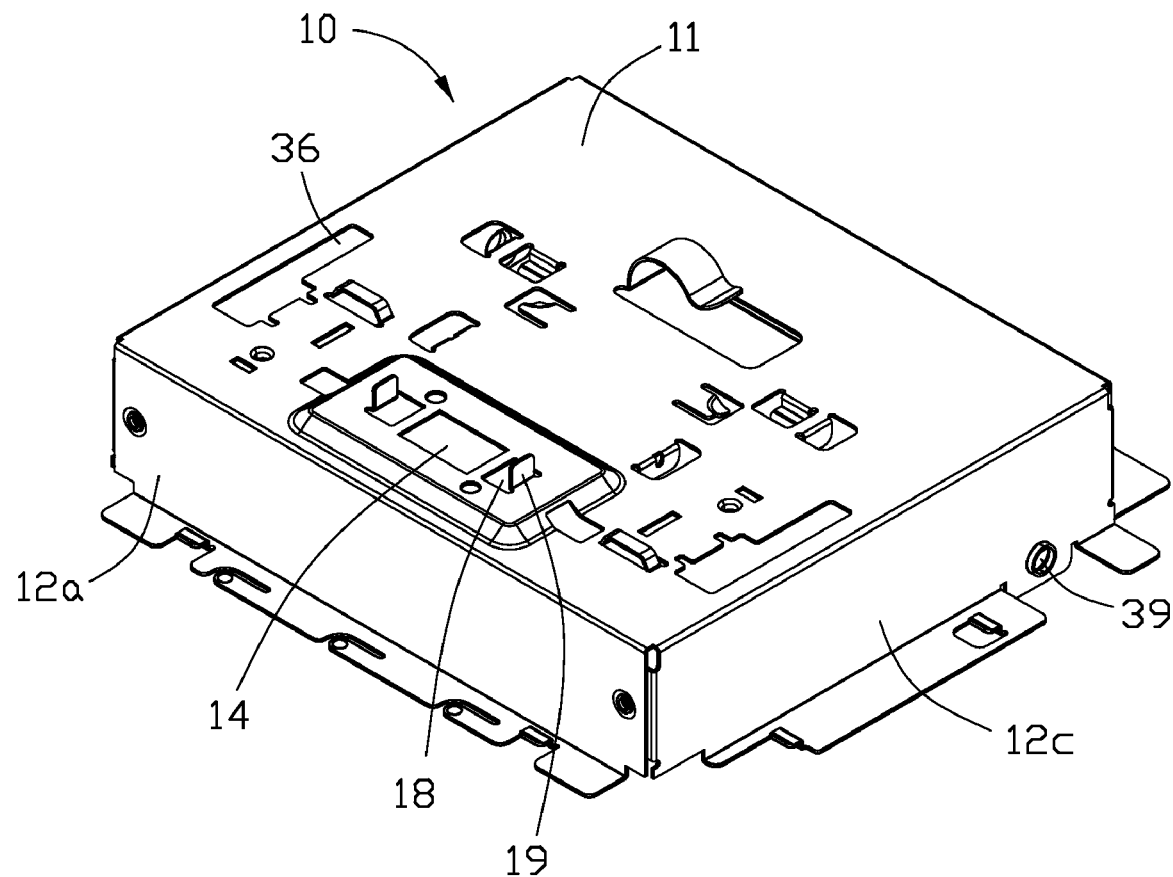
FIG. 4 is an inverted view of FIG. 3.

Referring to FIGS. 3 and 4, the retainer 10 includes a substantially square bottom wall 11, and two opposite sidewalls 12a, 12b and another two opposite sidewalls 12c, 12d extending from four side edges of the bottom wall 11. A recessed portion 13 is defined in the bottom wall 11 adjacent to the sidewall 12a for mounting the lock 60 therein. The recessed portion 13 defines an accommodating hole 14, and two through holes 18 therein. A block plate 19 is bent outward from an edge of each through hole 18. Two mounting portions 20 are formed on an inner surface of the bottom wall 11 for mounting the elastic support 70. Each mounting portion 20 includes an L-shaped retaining plate 22, two limiting plates 24, 26 at two opposite sides of the retaining plate 22, and a mounting plate 27 with a locking hole 272. The mounting plate 27 is formed at the same side with the limiting plate 26. Two through slots 36 are defined in the bottom wall 11 adjacent to the sidewalls 12c, 12d. A pivot hole 39 is defined in each of the sidewalls 12c, 12d adjacent to the sidewall 12b.

Figure 5:
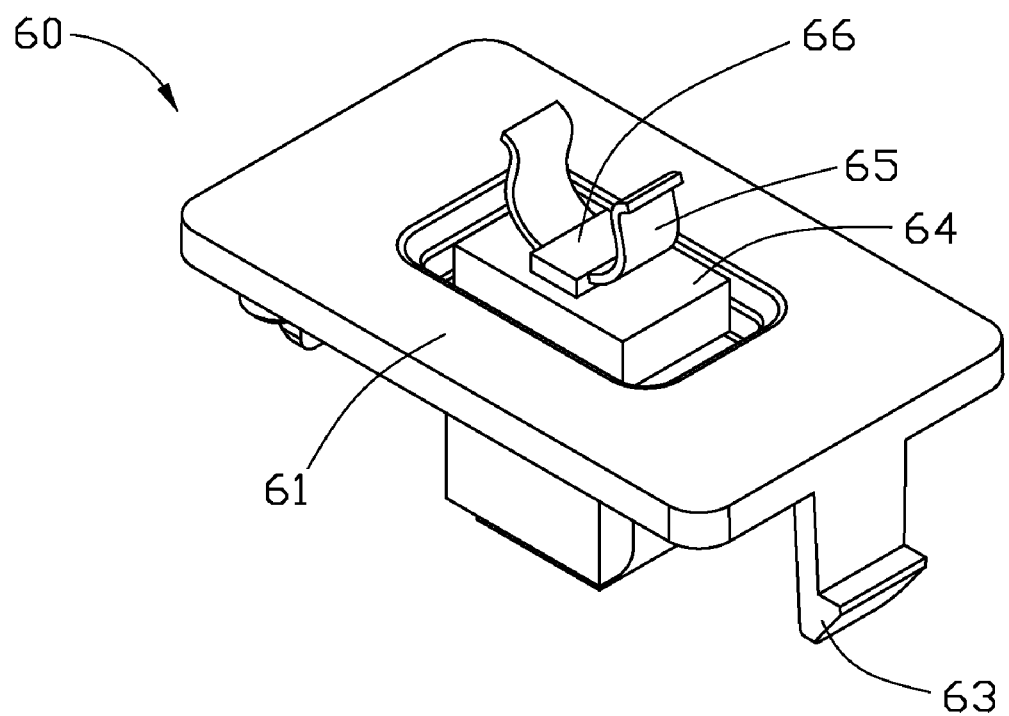
FIG. 5 is an enlarged view of the lock of FIG. 1.

Referring to FIG. 5, the lock 60 includes a substrate 61, and a push-push button 64 attached to the substrate 61. The substrate 61 forms two hooks 63 corresponding to the two block plates 19 of the retainer 10. The push-push button 64 includes two actuated retaining pieces 65, and a trigger 66 set between the retaining pieces 65. When the trigger 66 is triggered, the retaining pieces 65 are actuated to move to or toward each other; when the trigger 66 is triggered again, the retaining pieces 65 are actuated to move away from each other.

Figure 6:
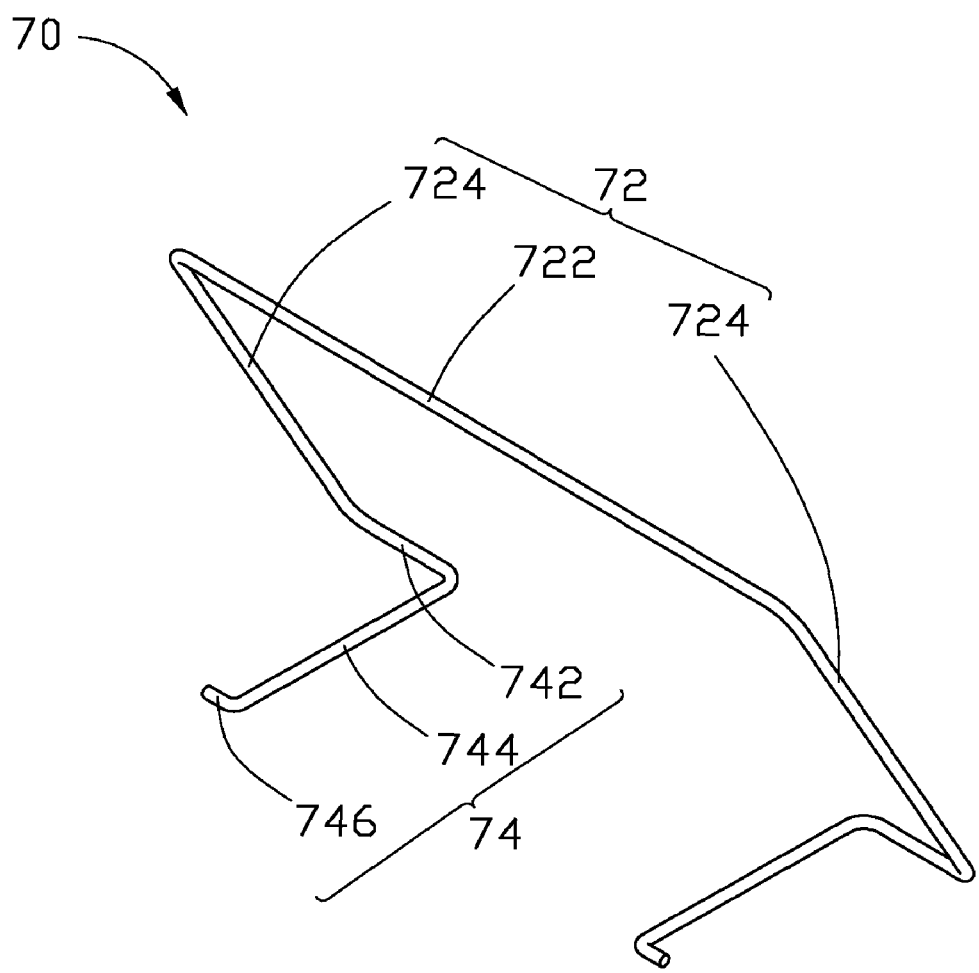
FIG. 6 is an enlarged view of the elastic support of FIG. 1.

Referring to FIG. 6, the elastic support 70 is made from a bent resilient steel wire. The elastic support 70 includes a substantially U-shaped pushing portion 72, and two substantially L-shaped fixing portions 74 extending from two distal ends of the pushing portion 72 towards each other. The pushing portion 72 includes a pushing segment 722, and two legs 724 extending from two opposite ends of the pushing segment 722. The pushing segment 722 and the two legs 724 are coplanar. Each fixing portion 74 includes a retaining segment 742 and an extending segment 744 forming the L shape. A locking segment 746 is formed from a distal end of the extending segment 744. The retaining segment 742, the extending segment 744, and the locking segment 746 defining a plane which has an adjustable angle with the plane of the pushing portion 72.

Figure 7:
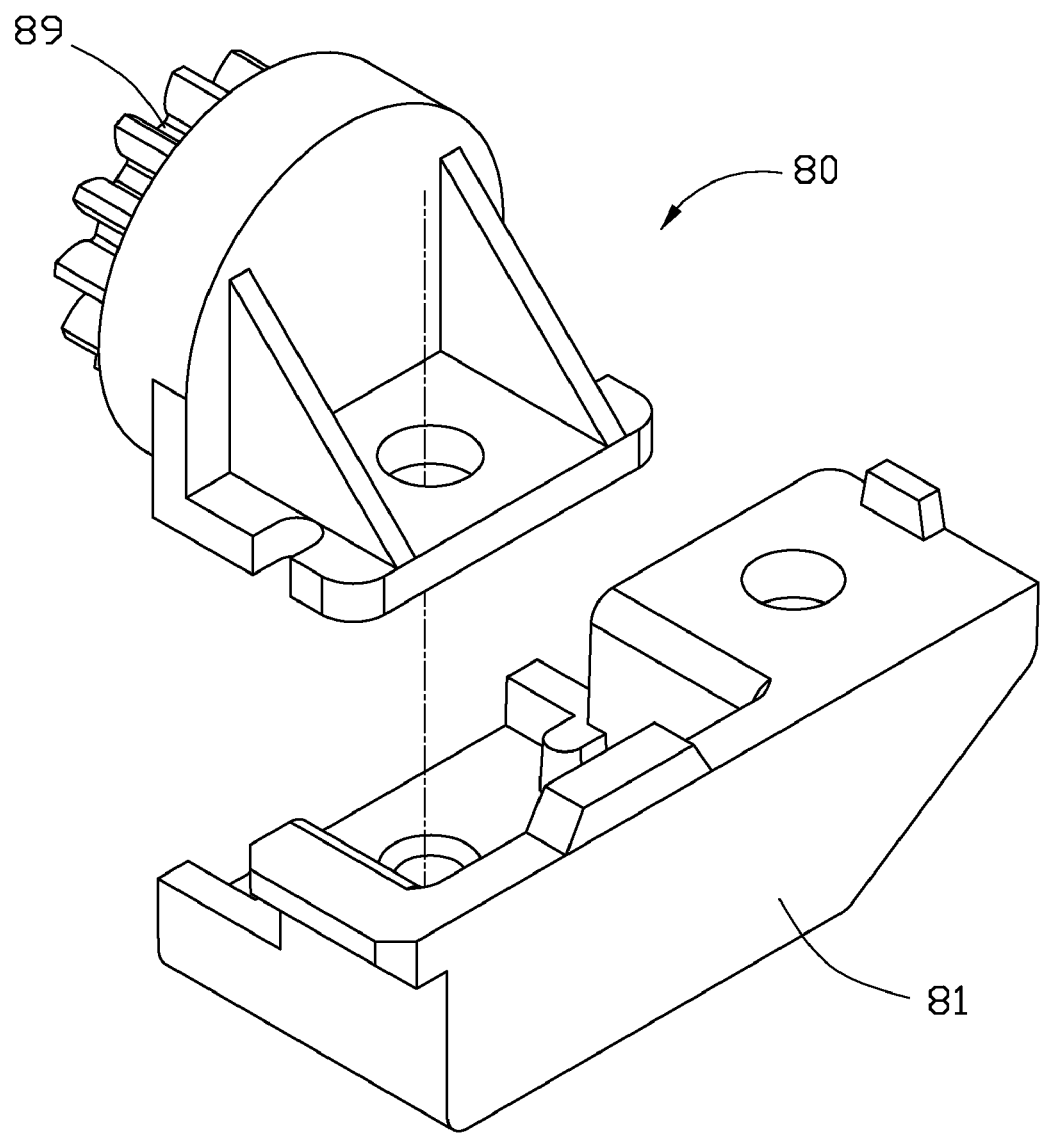
FIG. 7 is an enlarged view of the gear damper of FIG. 1.

Referring to FIG. 7, each gear damper 80 includes an installing portion 81, and a pinion gear 89 mounted to the back surface of the bottom wall 11 of the retainer 10 via the installing portion 81.

Figure 8:
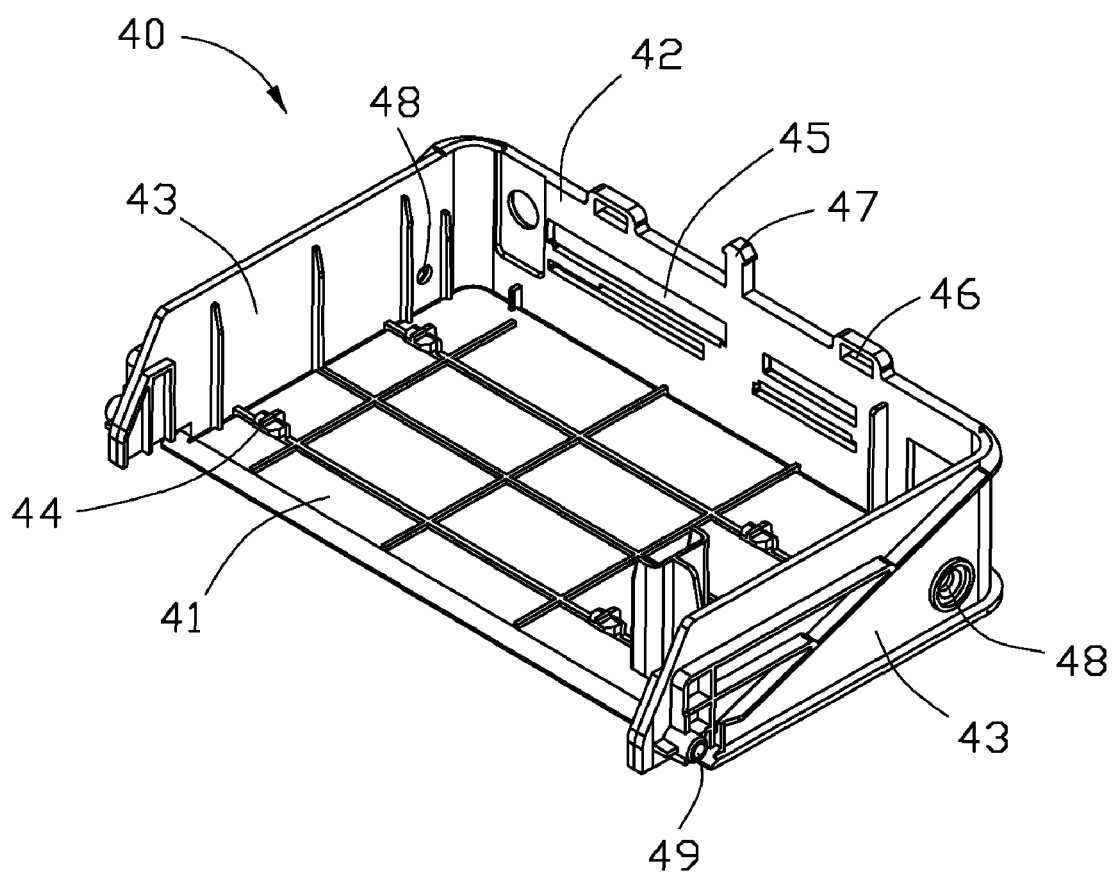
FIG. 8 is an enlarged, inverted view of the cover of FIG. 1.

Referring to FIG. 8, the cover 40 includes a base plate 41, and a front plate 42 and two side plates 43 extending from three edges of the base plate 41. An anchor 47 extends down from a bottom edge of the front plate 42 corresponding to the push-push button 64 of the lock 60. Two locking holes 46 are defined in the front plate 42 at opposite sides of the anchor 47. A through slot 45 is defined in the front plate 42 for a memory card extending therethrough to access the card reader 50. A through hole 48 is defined in each side plate 43 adjacent to the front plate 42. A plurality of bent tabs 44 is formed on the base plate 41. A pivot 49 extends out from an end of each side plate 43 which is away from the front plate 42.

Referring back to FIGS. 1 and 2, the card reader 50 defines a plurality of mounting slots 52 in the top surface thereof corresponding to the bent tabs 44 of the cover 40, and a plurality of mounting slots 56 in the bottom surface thereof. A threaded hole 54 defined in a side surface of the card reader 50, and a threaded hole 59 defined in a side surface of the interface module 58, are configured to align with the through holes 48 of the cover 40, respectively.

Figure 9:
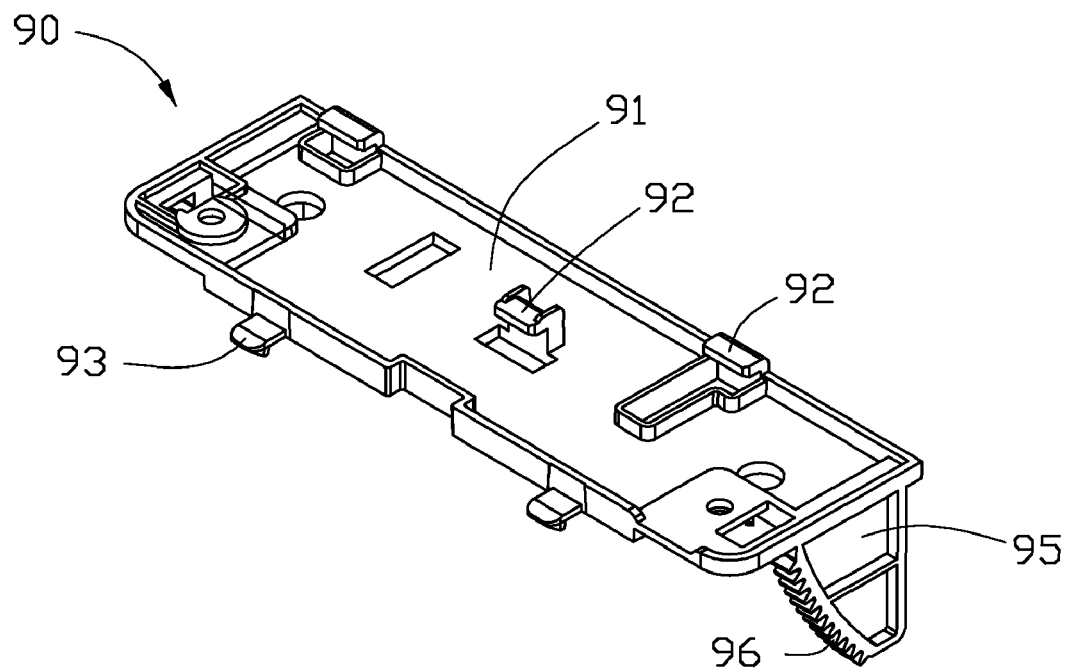
FIG. 9 is an enlarged, inverted view of the rotating shelf of FIG. 1.
Figure 10:
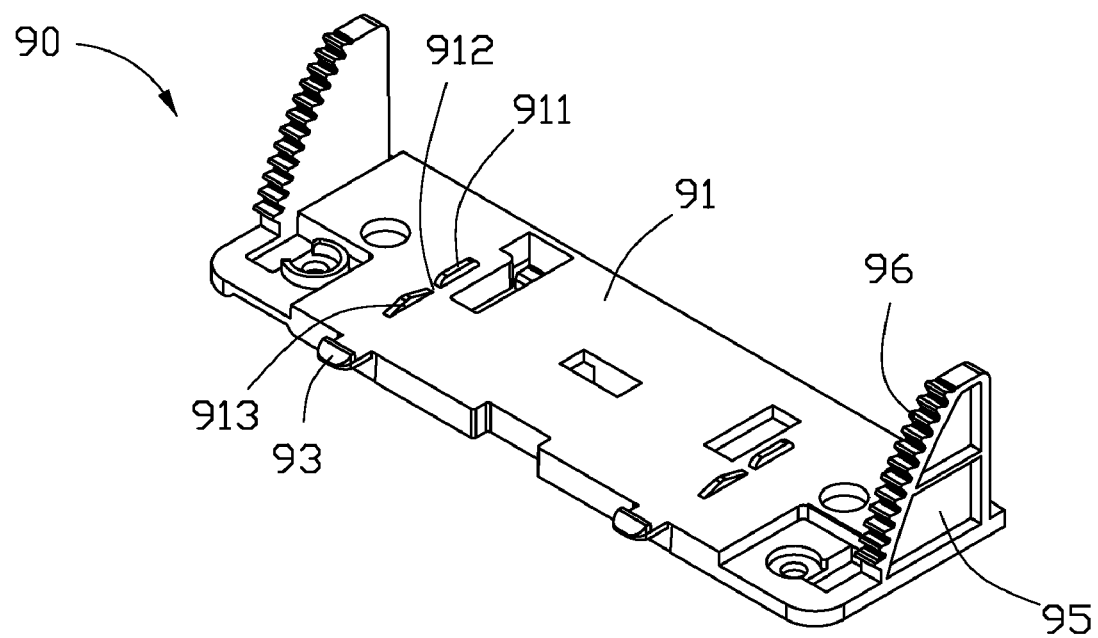
FIG. 10 is an inverted view of FIG. 9.
Figure 11:
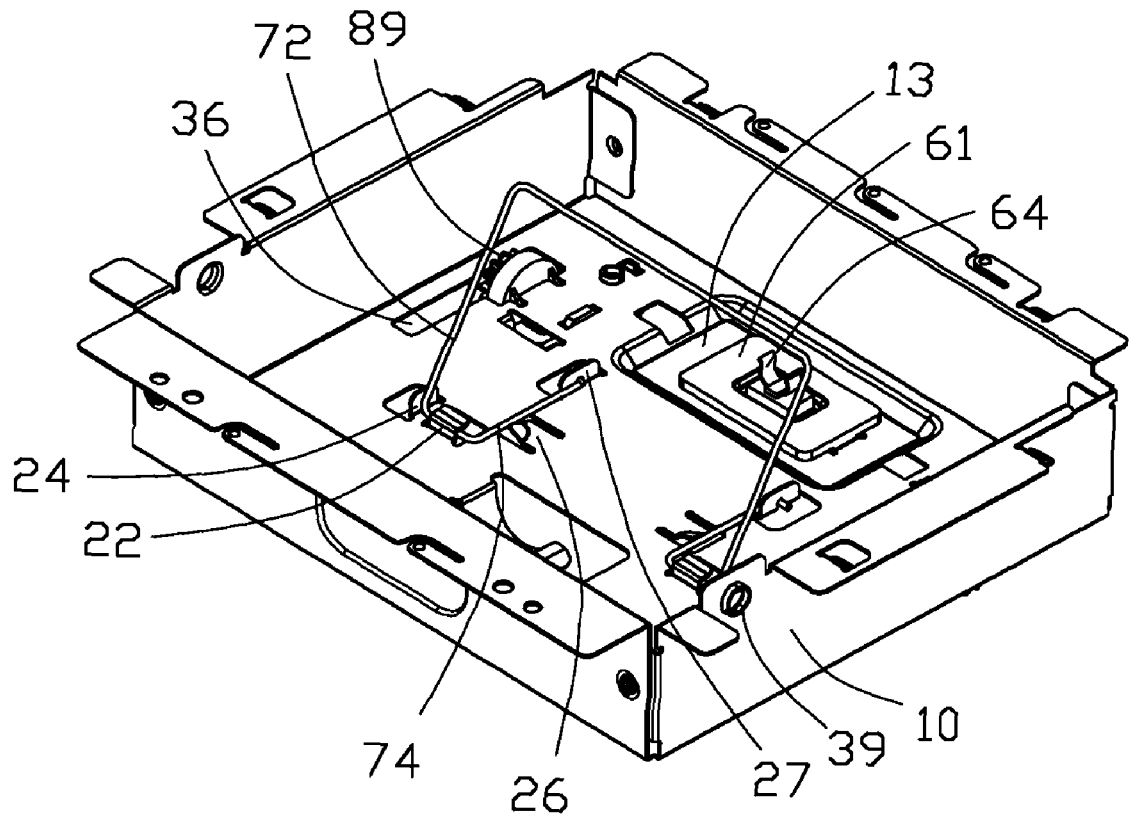
FIG. 11 is a partly assembled view of FIG. 1, showing the elastic support, the gear dampers, and the lock assembled in the retainer.

Referring to FIGS. 9 and 10, the rotating shelf 90 includes a rectangular main board 91, and two leg portions 95 extending from two opposite sides of the bottom surface of the main board 91. A plurality of bent tabs 92 is formed on the top surface of the main board 91 for engaging in the mounting slots 56 of the card reader 50. Two hooks 93 extend forward from a front edge of the main board 91 for engaging in the locking holes 46 of the cover 40. Two sets of protrusions, each set having a first protrusion 911 and a second protrusion 913, are formed on the bottom surface of the main board 91. Each set aligns in a direction perpendicular to the front edge of the main board 91. A gap 912 is defined between the first and second protrusions 911, 913 of each set. The second protrusions 913 are substantially triangular, forming two opposite bevels. Each leg portion 95 has a convex edge forming a rack 96 thereon.

Referring to FIGS. 3-6 and 11-12, in assembly, the push-push button 64 of the lock 60 is received in the accommodating hole 14 of the retainer 10, with the hooks 63 extending through the through holes 18 and engaging with the block plates 19. Thus, the lock 60 is secured in the recessed portion 13 of the retainer 10. The elastic support 70 is received in the retainer 10, with the retaining segments 742 engaged in the retaining plates 22, and the locking segment 746 inserted in the locking hole 272. The legs 724 abut against the limiting plates 24, and the extending segments 744 abut against the limiting plates 26. Thus, the elastic support 70 is mounted on the bottom wall 11 of the retainer 10.

Figure 12:
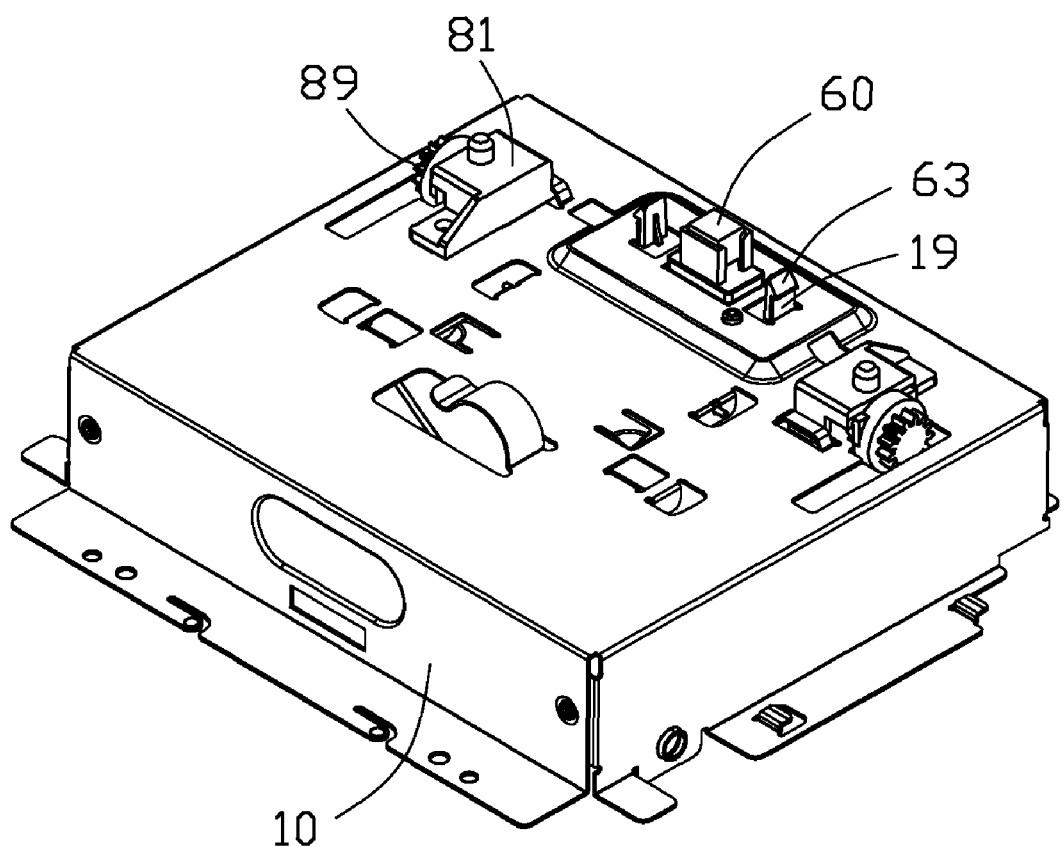
FIG. 12 is an inverted view of FIG. 11.
Figure 13:
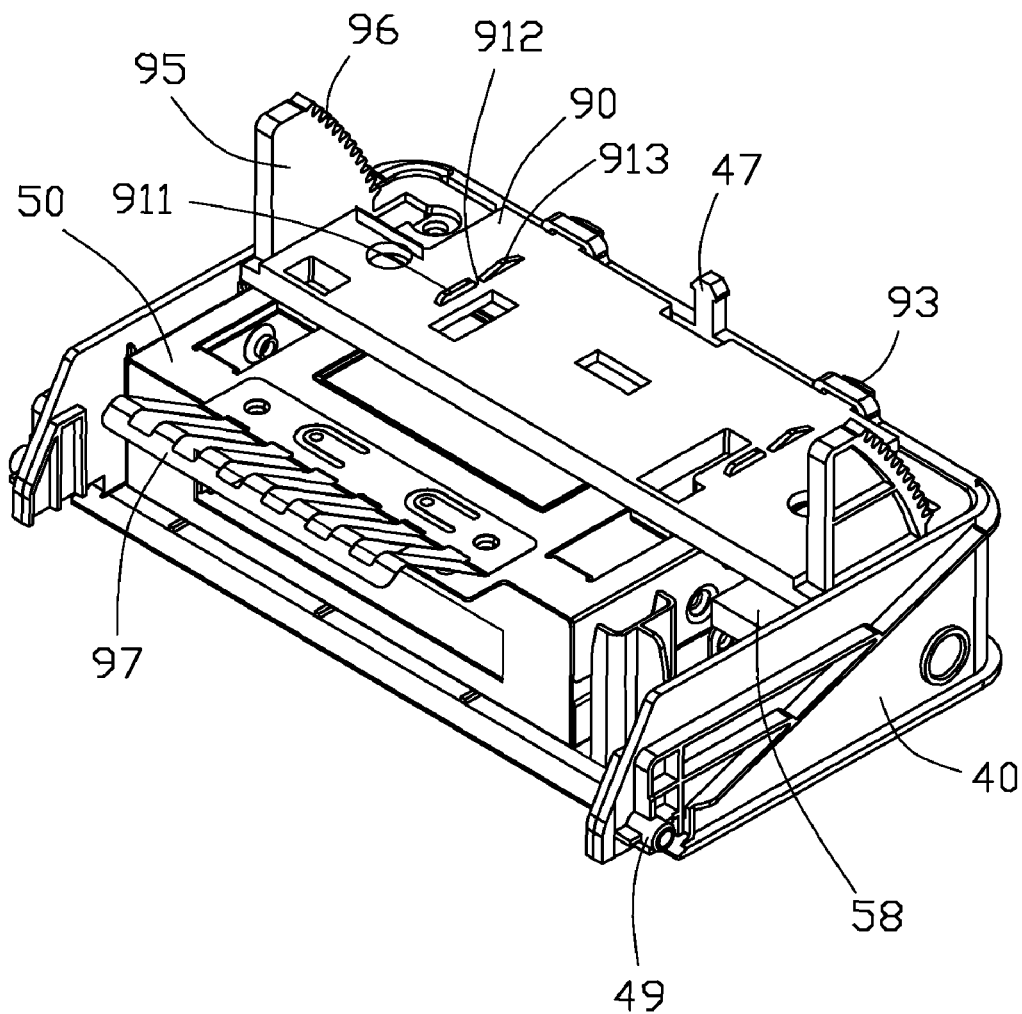
FIG. 13 is a partly assembled, inverted view of FIG. 1, showing the card reader and the rotating shelf assembled to the cover.
Figure 14:
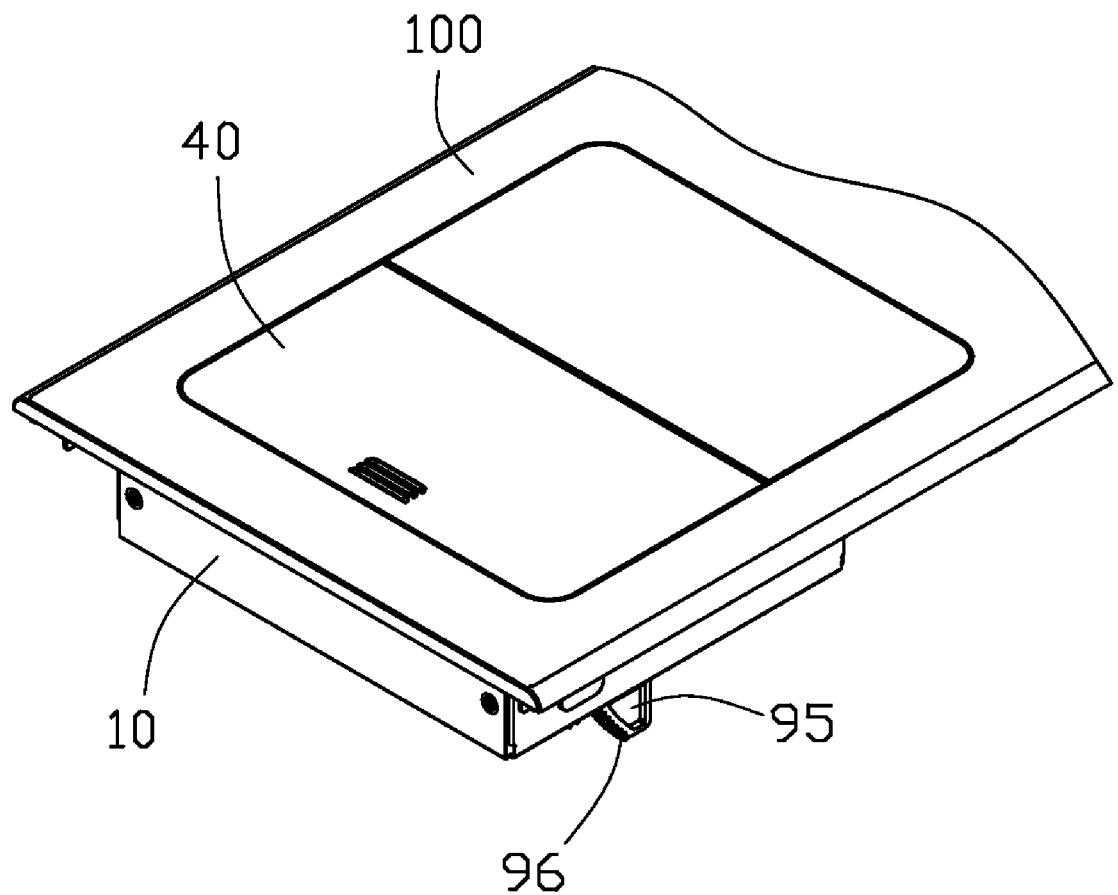
FIG. 14 is a fully assembled view of FIG. 1, showing a closed position.
Figure 15:
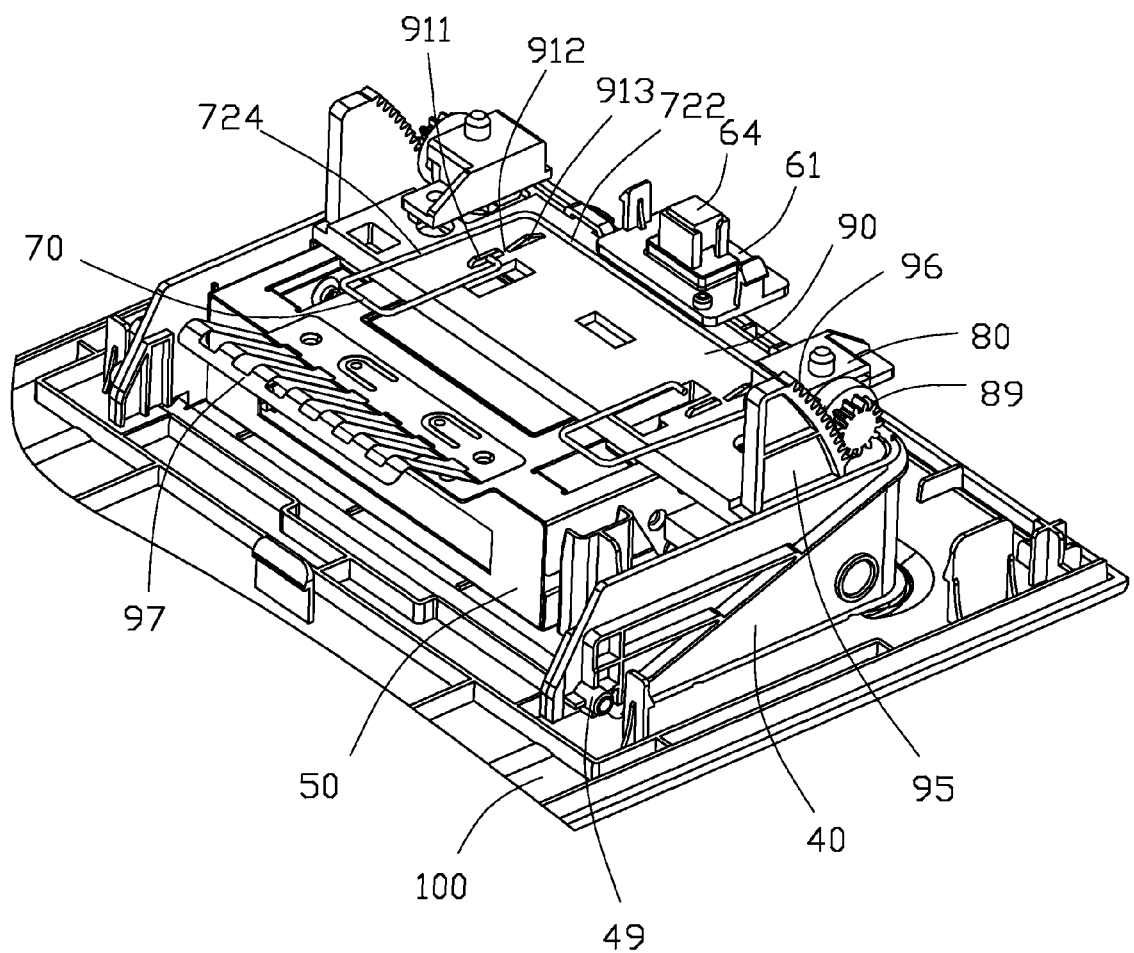
FIG. 15 is an inverted view of FIG. 14, with the retainer removed.
Figure 16:
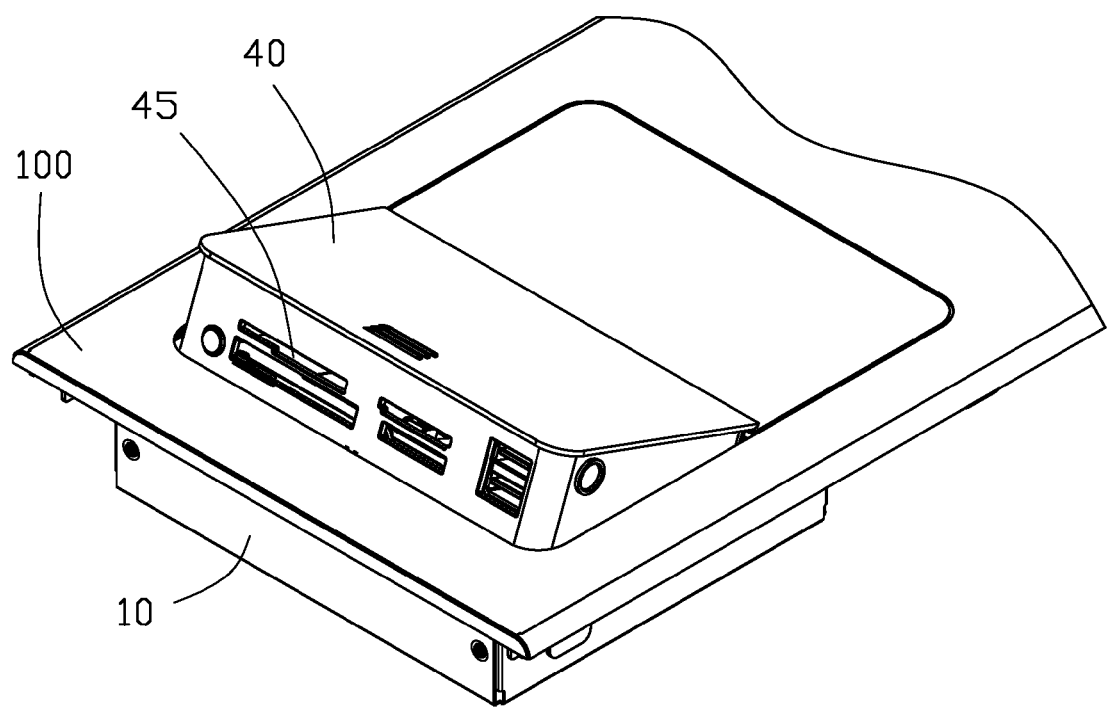
FIG. 16 is similar to FIG. 14, but showing an open position.
Figure 17:
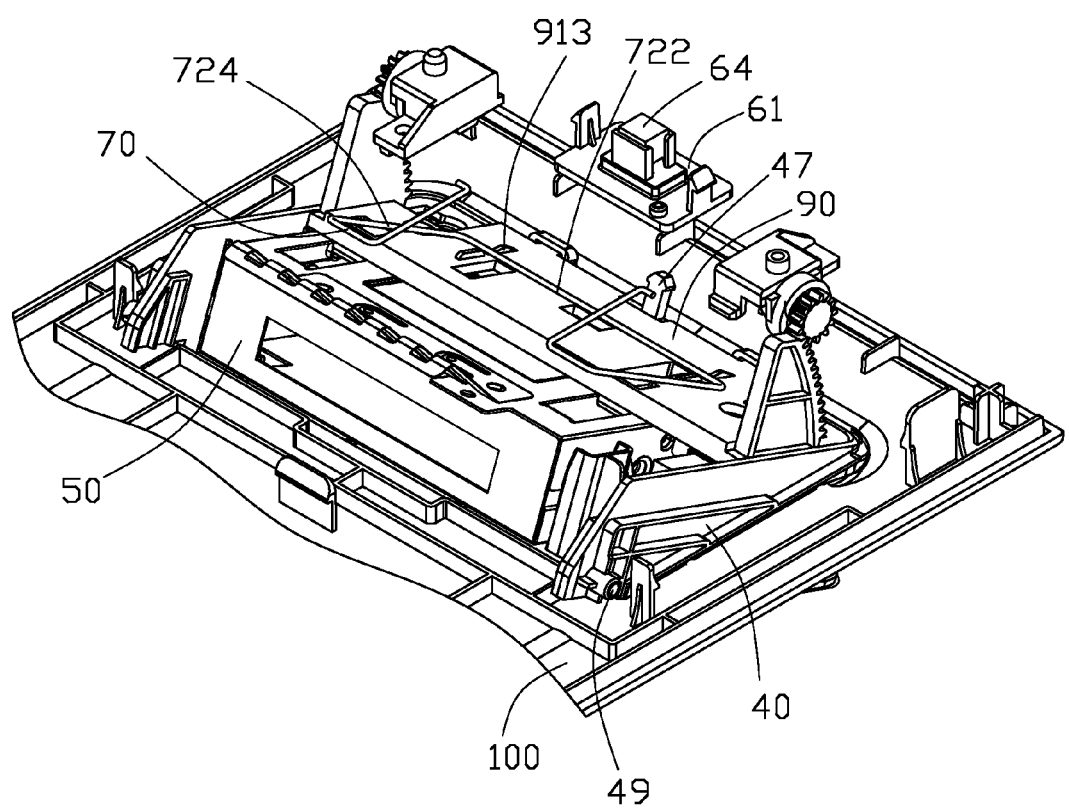
FIG. 17 is an inverted view of FIG. 16, with the retainer removed.

Referring to FIGS. 7 and 12, the pinion gear 89 is mounted to the installing portion 81 via a fastening element 200 (see FIG. 2), and the installing portion 81 is secured to the back surface of the bottom wall 11 of the retainer 10. Part of the pinion gear 89 enters the retainer 10 through the through slot 36.

Referring to FIGS. 1-2, 8-10, and 13, the bent tabs 44 of the cover 40 are inserted into the mounting slots 52 of the card reader, and a screw 202 (see FIG. 1) extends through the through hole 48 of the cover 40 and engages in the threaded hole 54 of the card reader 50. Thus, the card reader 50 is secured to the cover 40. A screw 204 (see FIG. 1) extends through another through hole 48 of the cover and engages in the threaded hole 59 of the interface module 58. Thus, the interface module 58 is secured to the cover 40. The bent tabs 92 of the main board 91 of the rotating shelf 90 are inserted into the mounting slots 56 of the card reader 50. The hooks 93 engage in the locking holes 46 of the cover 40. Thus, the rotating shelf 90 is attached to the card reader 50 and the cover 40. An electromagnetic interference (EMI) shield 97 is attached to the card reader 50.

Referring to FIGS. 11-17, the pivots 49 of the cover 40 are pivotably engaged in the pivot holes 39 of the retainer 10. When the cover 40 is pressed towards the panel 100 to shield the retainer 10, the leg portions 95 of the rotating shelf 90 extend into the through slots 36 of the retainer 10, and the racks 96 on the leg portions 95 engage with the pinion gears 89 of the gear dampers 80, such that the pinion gears 89 are driven by the racks 96. The pushing segment 722 is located in the gaps 912 between the first and second protrusions 911, 913. When continuing to push the cover 40 towards the panel 100, the rotating shelf 90 presses the pressing segment 722 and deforms the two legs 724, and pushes the pressing segment 722 to slip out from the gaps 912 along the bevel of the second protrusions 913. When the anchor 47 of the cover 40 triggers the trigger 66, the retaining pieces 65 are closed to hold the anchor 47. Thus, the cover 40 is locked in the retainer 10, and the EMI shield 97 abuts against the bottom wall 11 of the retainer 10.

When being opened to access the card reader 50, the cover 40 is depressed, so that the anchor 47 triggers the trigger 66. The retaining pieces 65 release the anchor 47, and the elastic support 70 is restored to push the card reader 50 and the cover 40 to move relative to the panel 100. Thus, the card reader 50 and the cover 40 are pivoted out from the opening 102 of the panel 100 and located slantingly (see FIGS. 16-17). During this course, the pushing segment 722 of the elastic support 70 rides over the second protrusions 913 again, and is located in the gaps 912. Meanwhile, the damping force generated during the rotation of the pinion gear 89 will restrain the restoring force of the elastic support 70, and gently release the spring energy of the elastic support 70. Therefore, the card reader 50 can be opened smoothly, gently, and quietly.

In other embodiments, positions of the racks 96 and the pinion gears 89 can be interchanged, i.e., the racks 96 are attached to the retainer 10 and the gear dampers 80 are attached to the cover 40. Then, each leg portion 95 has a concave end surface for the rack 96 arranged thereon.

It is to be understood, however, that even though numerous characteristics and advantages of the disclosure have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A container assembly for accommodating an electronic device in a panel, the container assembly comprising:
    a retainer attached to the panel, and configured for containing the electronic device;
    a cover pivotably attached to the retainer, and pivotable between an open position and a closed position relative to the panel;
    a lock arranged on the retainer for locking the cover at the closed position;
    a gear damper arranged on the retainer;
    a rotating shelf attached to the cover and sandwiching the electronic device with the cover, a rack formed on the rotating shelf configured for engaging with the gear damper; and
    an elastic support sandwiched between the retainer and the rotating shelf for biasing the cover to the open position via restoring force of the elastic support; wherein the gear damper depresses the restoring force of the elastic support.

2. The container assembly of claim 1, wherein the rotating shelf comprises a leg portion having a convex edge forming the rack thereon.

3. The container assembly of claim 2, wherein the gear damper comprises an installing portion, and a pinion gear mounted to a back surface of a bottom wall of the retainer via the installing portion; a through slot is defined in the bottom wall of the retainer, the mating pinion gear and the rack reside in the through slot.

4. The container assembly claim 1, wherein the elastic support is a resilient steel wire, which comprises a substantially U-shaped pushing portion, and two substantially L-shaped fixing portions extending from two distal ends of the pushing portion towards each other; the fixing portions are fixed on the retainer, and define an adjustable angle with the pushing portion; the pushing portion comprises a pushing segment and two legs extending from two opposite ends of the pushing segment.

5. The container assembly of claim 4, wherein the rotating shelf forms a first protrusion and a second protrusion on the bottom surface thereof, a gap is defined between the first and second protrusions; the second protrusion is substantially triangular, forming two opposite bevels; when the cover is opened, the pushing segment rides over one of the bevels to get into the gap, when the cover is closed, the pushing segment rides over the other one of the bevels to get out of the gap.

6. The container assembly of claim 5, wherein each fixing portion comprises a retaining segment extending from the distal end of the corresponding leg, and an extending segment extending from the distal end of the retaining segment; the retainer forms an L-shaped retaining plate retaining the retaining segment, and two limiting plates at two opposite sides of the retaining plate for limiting the leg and the extending segment.

7. The container assembly of claim 6, wherein a mounting plate with a locking hole defined therein is formed from the retainer, and a locking segment is formed from a distal end of the extending segment to engage in the locking hole.

8. The container assembly of claim 1, wherein the cover forms an anchor at a free end thereof; the lock comprises a push-push button which has two actuated retaining pieces, and a trigger between the retaining pieces; when the trigger is triggered by the anchor, the retaining pieces are closed to hold the anchor; when the trigger is triggered again, the retaining pieces release the anchor.

9. A container assembly comprising:
a retainer attached to a panel;
a cover pivotably attached to the retainer, an electronic device attached to the underside of the cover and pivotable together with the cover;
a pair of gear dampers arranged on the retainer;
a rotating shelf attached to the underside of the electronic device, the rotating shelf comprising a main board and a pair of leg portions extending down from the main board, a rack formed on an edge of each of the leg portions configured for engaging with the corresponding gear damper; and
an elastic support sandwiched between the retainer and the rotating shelf for biasing the cover to an open position via restoring force of the elastic support; wherein the gear damper depresses the restoring force of the elastic support.

10. The container assembly of claim 9, wherein each of the gear dampers comprises a pinion gear, each of the racks is convex mating with the pinion gear.

11. The container assembly of claim 10, wherein a pair of through slots is defined in a bottom wall of the retainer, for the mating gear dampers and the racks accommodating therein.

12. The container assembly of claim 11, wherein each of the pinion gears is attached to the back surface of the bottom wall of the retainer, and exposed from the corresponding through slot.

13. The container assembly of claim 12, further comprising a lock arranged on the bottom wall of the retainer between the two pinion gears, wherein an anchor extends down from the rotating shelf to be hold or released by the lock.

14. The container assembly of claim 9, wherein the elastic support is a resilient steel wire, which comprises a substantially U-shaped pushing portion, and two substantially L-shaped fixing portions extending from two distal ends of the pushing portion towards each other; the fixing portions are fixed on the retainer, and define an adjustable angle with the pushing portion; the pushing portion comprises a pushing segment and two legs extending from two opposite ends of the pushing segment.

15. The container assembly of claim 14, wherein the rotating shelf forms a first protrusion and a second protrusion on the bottom surface thereof, a gap is defined between the first and second protrusions; the second protrusion is substantially triangular, forming two opposite bevels; when the cover is opened, the pushing segment rides over one of the bevels to get into the gap, when the cover is closed, the pushing segment rides over the other one of the bevels to get out of the gap.

* * * * *